(12) United States Patent
Hasegawa

(10) Patent No.: US 11,354,317 B2
(45) Date of Patent: Jun. 7, 2022

(54) SAFETY ASSESSMENT APPARATUS, SAFETY ASSESSMENT METHOD, AND PROGRAM

(71) Applicant: NIPPON TELEGRAPH AND TELEPHONE CORPORATION, Tokyo (JP)

(72) Inventor: Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 67 days.

(21) Appl. No.: 17/052,211

(22) PCT Filed: Apr. 17, 2019

(86) PCT No.: PCT/JP2019/016447
§ 371 (c)(1),
(2) Date: Nov. 2, 2020

(87) PCT Pub. No.: WO2019/216137
PCT Pub. Date: Nov. 14, 2019

(65) Prior Publication Data
US 2021/0232587 A1    Jul. 29, 2021

(30) Foreign Application Priority Data
May 8, 2018    (JP) .............................. JP2018-089641

(51) Int. Cl.
*G06F 16/2455*    (2019.01)
*G06F 16/2457*    (2019.01)
(Continued)

(52) U.S. Cl.
CPC ...... *G06F 16/24564* (2019.01); *G06F 16/221* (2019.01); *G06F 16/2246* (2019.01);
(Continued)

(58) Field of Classification Search
CPC ............ G06F 16/2246; G06F 21/6245; G06F 16/24564
(Continued)

(56) References Cited

U.S. PATENT DOCUMENTS 9,600,524 B2 *   3/2017   He ......................... G06F 16/48
2018/0210907 A1*  7/2018   Hamada .............. G06F 16/2255

OTHER PUBLICATIONS

Herranz, et al., "Kd-trees and the real disclosure risks of large statistical databases", Information Fusion 13, Elsevier B.V., Apr. 14, 2011, pp. 260-273.
(Continued)

*Primary Examiner* — Hung T Vy
(74) *Attorney, Agent, or Firm* — Xsensus LLP

(57) ABSTRACT

The safety of a database that conceals large-scale data is efficiently assessed. A database storage (10) stores an original database and a secure database. A neighbor record search part (11) obtains a neighbor record set by a neighbor search of the original database for each record in the secure database. A nearest neighbor record calculation part (13) calculates a distance between each record in the secure database and each record in the neighbor record set and obtains a nearest neighbor record. A re-identification determination part (14) calculates a re-identification rate of a record based on whether the record in the original database corresponding to each record in the secure database matches the nearest neighbor record. A re-identification rate calculation part (15) calculates a re-identification rate of the secure database based on the re-identification rate calculated for each record in the secure database.

6 Claims, 5 Drawing Sheets

(51) Int. Cl.
  *G06F 16/22* (2019.01)
  *G06F 16/25* (2019.01)
(52) U.S. Cl.
  CPC .... *G06F 16/2282* (2019.01); *G06F 16/24573* (2019.01); *G06F 16/258* (2019.01)
(58) Field of Classification Search
  USPC ........................................................ 707/694
  See application file for complete search history.

(56) References Cited

OTHER PUBLICATIONS

Lefevre et al., "Incognito: Efficient Full-Domain K-Anonymity", Proceedings of the 2005 ACM SIGMOD international conference on Management of data, Jun. 14-16, 2005, 12 pages.

Kohlmayer et al., "Flash: Efficient, Stable and Optimal K-Anonymity", Proceedings of the 4th IEEE International Conference on Information Privacy, Security, Risk and Trust (PASSAT), 2012, pp. 1-10.

Ikarashi et al., "Randomized K-Anonymization for Numeric Attributes", Computer Security Symposium 2011, Oct. 19-21, 2011, pp. 450-455 (12 Pages with English Translation).

Ikarashi et al., "A Probabilistic Extension of K-Anonymity", Computer Security Symposium 2009, 12 pages with English translation.

Torra et al., "Using Mahalanobis Distance-Based Record Linkage for Disclosure Risk Assessment", International Conference on Privacy in Statistical Databases, 2006, pp. 233-242.

Ferrer et al., "Distance-based and probabilistic record linkage for re-identification of records with categorical variables", Butlleti de IACIA, Associacio Catalana dIntelligencia Artificial, 2002, 8 pages.

\* cited by examiner

| ORIGINAL DATABASE $\vec{X}$ M ATTRIBUTES | | |
|---|---|---|
| GENDER | AGE | ... |
| MALE | 12 | ... |
| FEMALE | 31 | ... |
| MALE | 18 | ... |
| ... | ... | ... |
| FEMALE | 14 | ... |

Row indices: 1, 2, 3, ..., N

| SECURE DATABASE $\vec{Y}$ M ATTRIBUTES | | |
|---|---|---|
| GENDER | AGE | ... |
| FEMALE | 21 | ... |
| FEMALE | 30 | ... |
| MALE | 12 | ... |
| ... | ... | ... |
| MALE | 18 | ... |

Row indices: 1, 2, 3, ..., N

ROW NUMBER CORRESPONDENCE FUNCTION $f_y$

| SECURE DATA ROW NUMBER | ORIGINAL DATA ROW NUMBER |
|---|---|
| 1 | 4 |
| 2 | 5 |
| 3 | 1 |
| ... | ... |
| N | 3 |

FIG. 1

SAFETY ASSESSMENT APPARATUS, SAFETY ASSESSMENT METHOD, AND PROGRAM

CROSS-REFERENCE TO RELATED APPLICATIONS

The present application is based on PCT filing PCT/JP2019/016447, filed Apr. 17, 2019, which claims priority to JP 2018-089641, filed May 08, 2018, the entire contents of each are incorporated herein by reference.

TECHNICAL FIELD

The present invention relates to a technique for assessing the safety of a database that conceals individual data by a deterministic method or a probabilistic method for a database.

BACKGROUND ART

Techniques for concealing individual data by the deterministic method for a database (hereinafter referred to as "original database") include a k-anonymity method (see Non-patent literatures 1 and 2). Further, techniques for concealing by the probabilistic method include a Pk-anonymity method (see Non-patent literatures 3 and 4). In order to assess the safety of a database that has been subjected to the concealing processing (hereinafter referred to as "secure database"), a method called record linkage (see Non-patent literatures 5 and 6) is used. The record linkage is a method for measuring how well a record is concealed by trying to re-identify the record. In the prior art, distances between a target record in the secure database for which re-identification is tried and all records in the original database are calculated, and if the nearest neighbor record matches the target record, it is considered as re-identification is completed, and an inverse of a nearest neighbor record number is set as a re-identification rate of the target record. This is done for all records in the secure database, and a total value of re-identification rates of the respective records is assessed as a re-identification rate of the database.

PRIOR ART LITERATURE

Non-Patent Literature

Non-patent literature 1: Kristen LeFevre, David J DeWitt, and Raghu Ramakrishnan, "Incognito: Efficient full-domain k-anonymity", Proceedings of the 2005 ACM SIGMOD international conference on Management of data, pp. 49-60, 2005.
Non-patent literature 2: Florian Kohlmayer, Fabian Prasser, Claudia Eckert, Alfons Kemper, and Klaus A Kuhn, "Flash: efficient, stable and optimal k-anonymity", Privacy, Security, Risk and Trust (PASSAT), 2012 International Conference on and 2012 International Conference on Social Computing (SocialCom), pp. 708-717, 2012.
Non-patent literature 3: Dai Ikarashi, Koji Chida, and Katsumi Takahashi, "Randomized k-anonymization for numeric attributes", Computer Security Symposium 2011, pp. 450-455, 2011.
Non-patent literature 4: Dai Ikarashi, Koji Chida, and Katsumi Takahashi, "A probabilistic extension of k-anonymity", Computer Security Symposium 2009, pp. 1-6, 2009.
Non-patent literature 5: Vicenc Torra, John M Abowd, and Josep Domingo-Ferrer, "Using mahalanobis distance-based record linkage for disclosure risk assessment", International Conference on Privacy in Statistical Databases, pp. 233-242, 2006.
Non-patent literature 6: Josep Domingo-Ferrer and Vicenc Torra, "Distance-based and probabilistic record linkage for re-identification of records with categorical variables", Butlleti de IACIA, Associacio Catalana dIntelligencia Artificial, pp. 243-250, 2002.

SUMMARY OF THE INVENTION

Problems to be Solved by the Invention

Recently, the utilization of big data is drawing attention, and it is expected that data to be anonymized will also be large-scale data. In the prior art, it is a problem that a processing time increases as the number of records increases at the time of record linkage. More specifically, as the number of records increases linearly, the processing time increases by the square. Therefore, it is a problem to perform the record linkage for large-scale data within a practical processing time.

In view of the above technical problem, the present invention aims to efficiently assess the safety of a database that conceals large-scale data.

Means to Solve the Problems

In order to solve the above problem, a safety assessment apparatus according to one aspect of the invention comprises a database storage that stores an original database composed of a plurality of records and a secure database that conceals the original database, a neighbor record search part that obtains, for each record in the secure database, a neighbor record set having a predetermined neighborhood number by a neighbor search of the original database, a nearest neighbor record calculation part that calculates, for each record in the secure database, a distance from each record in the neighbor record set and obtains a nearest neighbor record based on the distance from the record, a re-identification determination part that calculates, for each record in the secure database, a re-identification rate of the record based on whether a record in the original database corresponding to the record in the secure database matches the nearest neighbor record, and a re-identification rate calculation part that calculates a re-identification rate of the secure database based on the re-identification rate calculated for each record in the secure database.

Effects of the Invention

According to the present invention, when performing the record linkage, processing that requires an amount of calculation of $O(N^2)$ in the prior art becomes an amount of calculation of $O(N \log N)$ when the number of neighbors is log N. Therefore, the record linkage can be performed within a practical processing time for large-scale data. Thus, it is possible to efficiently assess the safety of a database that conceals large-scale data.

BRIEF DESCRIPTION OF THE DRAWINGS

FIG. 1 is a diagram for illustrating definition of a database targeted by the present invention.

DETAILED DESCRIPTION OF THE EMBODIMENTS

Figure 2:
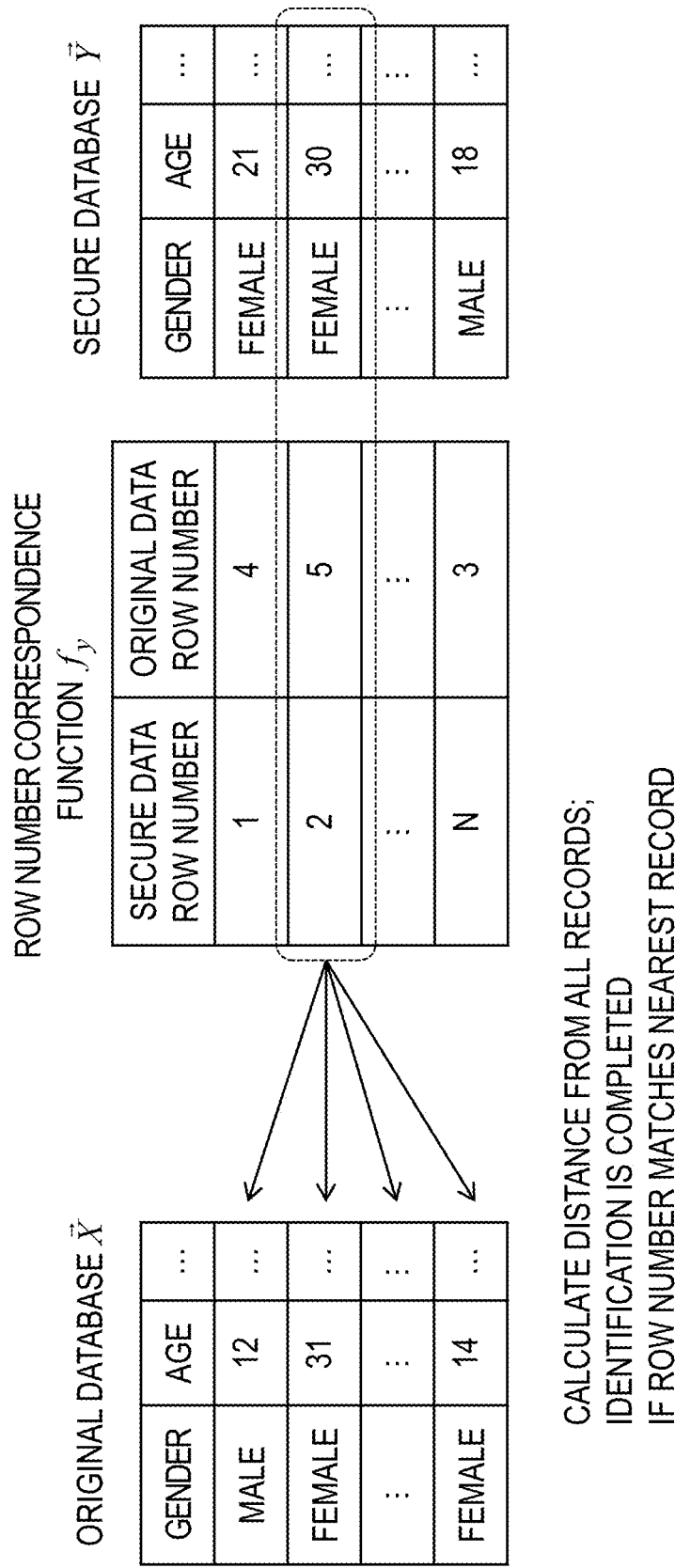
FIG. 2 is a conceptual diagram for illustrating conventional record linkage.

Hereinafter, an embodiment of the present invention will be described in detail. Components having the same functions are provided with the same reference numerals in the drawings, and redundant description will be omitted.

[Symbol]

A set of certain attributes is expressed as an upper case X, whereas a value of the attribute X is expressed as a lower case $x \in X$.

One record in a database is expressed as a horizontal vector. For example, an ith record in a database having M attributes is $\vec{x}_i = \{x_{i1}, \ldots, x_{ij}, \ldots, x_{iM}\}$.

A set composed of a plurality of records is a database $\vec{X}$. For example, a database including N records is $\vec{X} = \{\vec{x}_1, \ldots, \vec{x}_N\}$.

A set composed of records in which the respective records in the database $\vec{X}$ are concealed by the deterministic method or the probabilistic method is a secure database $\vec{Y}$. For example, a secure database having a record number N is $\vec{Y} = \{\vec{y}_1, \ldots, \vec{y}_N\}$.

The order of records in the secure database $\vec{Y}$ may be shuffled. Therefore, a row number correspondence function $f_y: R \rightarrow R$ that associates row numbers in the secure database $\vec{Y}$ with row numbers in the original database $\vec{X}$ (hereinafter sometimes referred to as "true row numbers") is defined.

FIG. 1 shows an example of the original database $\vec{X}$, the secure database $\vec{Y}$, and the row number correspondence function $f_y$. The original database $\vec{X}$ is a database including N plaintext records each having M attributes. The secure database $\vec{Y}$ is a database in which the records in the original database are concealed and the order is shuffled. The row number correspondence function $f_y$ is a reference table showing correspondence between row numbers in the original database and row numbers in the secure database.

[Outline of Processing]

A safety assessment technique of the present invention uses the original database $\vec{X}$, the secure database $\vec{Y}$, and the row number correspondence function $f_y$ to calculate a re-identification rate of the entire database, and assesses the safety. In the present invention, roughly the following two processes are performed when calculating the re-identification rate of a record.

Process 1. To obtain neighbor records of a record that is a target of a neighbor search as many as a specified neighborhood number. The search for neighbor records includes one using a tree structure (see Reference literature 1) and one using hashing (see Reference literature 2), and they are used to obtain neighbor records. The tree structure includes, for example, a kd tree.

[Reference literature 1] Jon Louis Bentley, "Multidimensional binary search trees used for associative searching", Communications of the ACM, Vol. 18, No. 9, pp. 509-517, 1975.

[Reference literature 2] Mayur Datar, Nicole Immorlica, Piotr Indyk, and Vahab S Mirrokni, "Locality-sensitive hashing scheme based on p-stable distributions", In Proceedings of the twentieth annual symposium on Computational geometry, pp. 253-262, 2004.

Process 2. To calculate distances between a record linkage target record based on the neighbor records and the neighbor records, and if a row number of the nearest neighbor record matches a true row number of the record linkage target record, determine that re-identification is completed. As a distance to be calculated, an appropriate distance, for example, Euclidean distance, Hamming distance, and Manhattan distance can be used. When attribute values of records are duplicated, neighbor records equal to or more than the neighborhood number specified in the neighbor search are obtained. In that case, after excluding duplicate records in the neighbor records, distances from neighbor records are calculated.

Processes 1 and 2 are performed for each record in the secure database, the total value of re-identification rates of respective records is set as a re-identification rate of the database, and the safety of the entire secure database is assessed.

Figure 3:
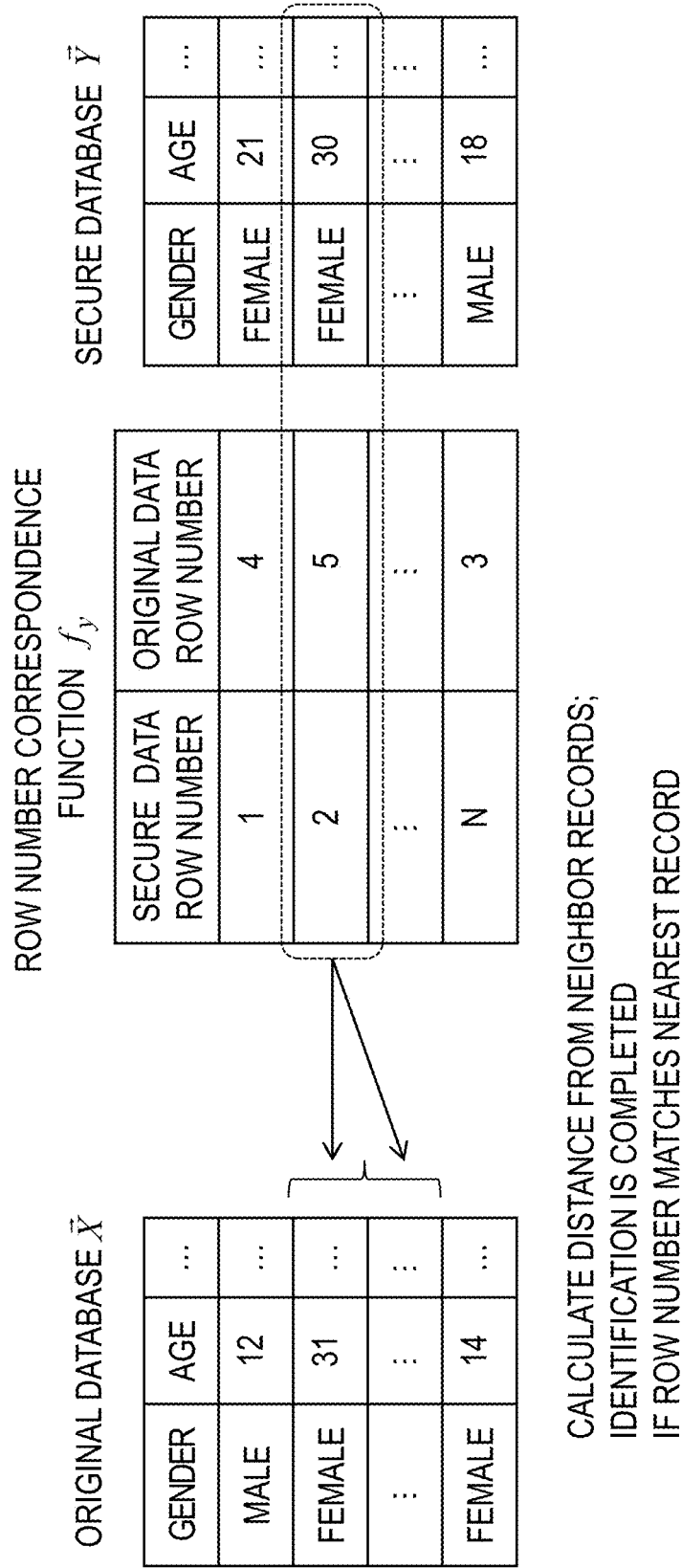
FIG. 3 is a conceptual diagram for illustrating record linkage of the present invention.

FIG. 2 is a conceptual diagram representing record linkage according to the prior art, whereas FIG. 3 is a conceptual diagram representing record linkage according to the present invention. In the prior art, for a record in the secure database, distances from all records in the original database are calculated, and it is determined to be re-identified if the row number of the nearest record matches the true row number of the record. On the other hand, in the present invention, for a record in the secure database, distances from neighbor records having the predetermined neighborhood number obtained by the neighbor search from the original database are calculated, and it is determined to be re-identified if the row number of the nearest record matches the true row number of the record.

In the present invention, either a neighbor search using the tree structure or a neighbor search using hashing is used. A specific process of the present invention is shown in <Algorithm 1>. Process 1 (neighbor search) corresponds to 2nd to 7th lines, and Process 2 (record linkage based on neighbor records) corresponds to 8th to 22nd lines. Note that |•| represents the number of elements in a set •.

<Algorithm 1> Record linkage using the neighbor search
Input: an original database with N records $\vec{X} = \{\vec{x}_1, \ldots, \vec{x}_N\}$, a secure database with N records $\vec{Y} = \{\vec{y}_1, \ldots, \vec{y}_N\}$, a row number correspondence function $f_y: R \rightarrow R$, a neighborhood number K (1<K<N), and a permissible range ε (ε>1)

Output: a re-identification rate r
1:     r←0
2:     for i=1 to N do
3:        obtain a neighbor record set $\vec{X}_i^{near} = \{\vec{x}_j\}$ (where $|\vec{X}_i^{near}| \geq K$)
in the original database $\vec{X}$ with respect to $\vec{y}_i$ by the neighbor search
4:     end for
5:     if there is i at which $|\vec{X}_i^{near}| > \varepsilon K$ is satisfied, then
6:        with respect to i at which $|\vec{X}_i^{near}| > \varepsilon K$ is satisfied, as
$\vec{X}_i^{uniq} = \{\vec{x}_j\}$ denotes a record set obtained by excluding duplication from $\vec{X}_i^{near}$, hold a function $f^i_{dup}$ which returns a row number set of duplicate records corresponding to each $\vec{x}_j$
7:     end if
8:     for i=1 to N do
9:        if $|\vec{X}_i^{near}| > \varepsilon K$ is satisfied, then
10:          find a distance between $\vec{y}_i$ and each record of $\vec{X}_i^{uniq}$, and a record nearest to $\vec{y}_i$ is set as a nearest neighbor record $\vec{Z}$
11:          if $\vec{Z}$ includes a record that satisfies $f_y(k)=i$ (where k: $\vec{x}_k \in \vec{Z}$), then
12:             for $\vec{x}_j \in \vec{Z}$ do
13:                r←r+1/(|f$^i_{dup}$(j)||$\vec{Z}$|)

-continued

```
14:            end for
15:          end if
16:       else
17:          find a distance between $\vec{y}_i$ and each record of $\vec{X}_i^{near}$, and
a record nearest to $\vec{y}_i$ is set as a nearest neighbor record $\vec{Z}$
18:          if $\vec{Z}$ includes a record that satisfies $f_y(k)=i$
(where k: $\vec{x}_k \in \vec{Z}$), then
19:             $r \leftarrow r+1/|\vec{Z}|$
20:          end if
21:       end if
22:    end for
```

First, a neighbor record set $\vec{X}_i^{near}$ is obtained using the neighbor search for each record $\vec{y}_i$ in the secure database $\vec{Y}$ (corresponding to 2nd to 4th lines). If there are few duplicate records in the original database $\vec{X}$, the obtained neighbor record set $\vec{X}_i^{near}$ is equal to or less than the specified neighborhood number K. However, if there are many duplicate records in the original database $\vec{X}$, the obtained neighbor record set $\vec{X}_i^{near}$ may exceed the specified neighborhood number K, and the effect of the neighbor search may be lost. Therefore, if the neighbor record set $\vec{X}_i^{near}$ exceeds $\varepsilon K$, a function $f_{dup}$ is held that generates a record set $\vec{X}_i^{near}$ in which duplicate records are excluded from the neighbor record set $\vec{X}_i^{near}$ and returns the row numbers of the duplicate records (corresponding to 5th to 7th lines). Note that the permissible range E and the neighborhood number K may be set to, for example, $\varepsilon=2.0$ and K=log N.

Next, a distance from each record in the neighbor record set for each record $\vec{y}_i$ in the secure database $\vec{Y}$ is calculated, and if the true row number (that is, the row number in the original database) of the nearest record matches the true row number of the current record (that is, the row number in the original database associated with the row number in the secure database of the current record), a re-identification rate r is added as a re-identification success.

More specifically, if the number of records in the neighbor record set $\vec{X}_i^{near}$ exceeds $\varepsilon K$, a distance from each record in the neighbor record set $\vec{X}_i^{uniq}$ in which duplication is excluded is calculated. Then, the true row number of a duplicate record of the nearest record is searched for, and if it matches the row number of the current record, assuming that re-identification has been completed on average among the duplicate records, 1/the number of duplicate records ($1/|f_{dup}|$) is added as the re-identification rate. At that time, if the number of the nearest neighbor records is plural, assuming that those have also been re-identified on average, $(1/|\vec{Z}|)$ is added (corresponding to 9th to 15th lines).

If the number of records in the neighbor record set $\vec{X}_i^{near}$ is equal to or less than $\varepsilon K$, first a distance from each record in the neighbor record set $\vec{X}_i^{near}$ is calculated. Then, the true row number of a duplicate record of the nearest record is searched for, and if it matches the row number of the current record, 1 is added as the re-identification rate. At that time, if the number of the nearest neighbor records is plural, assuming that those have been re-identified on average, $(1/|\vec{Z}|)$ is added (corresponding to 16th to 21st lines).

Embodiment

Figure 4:
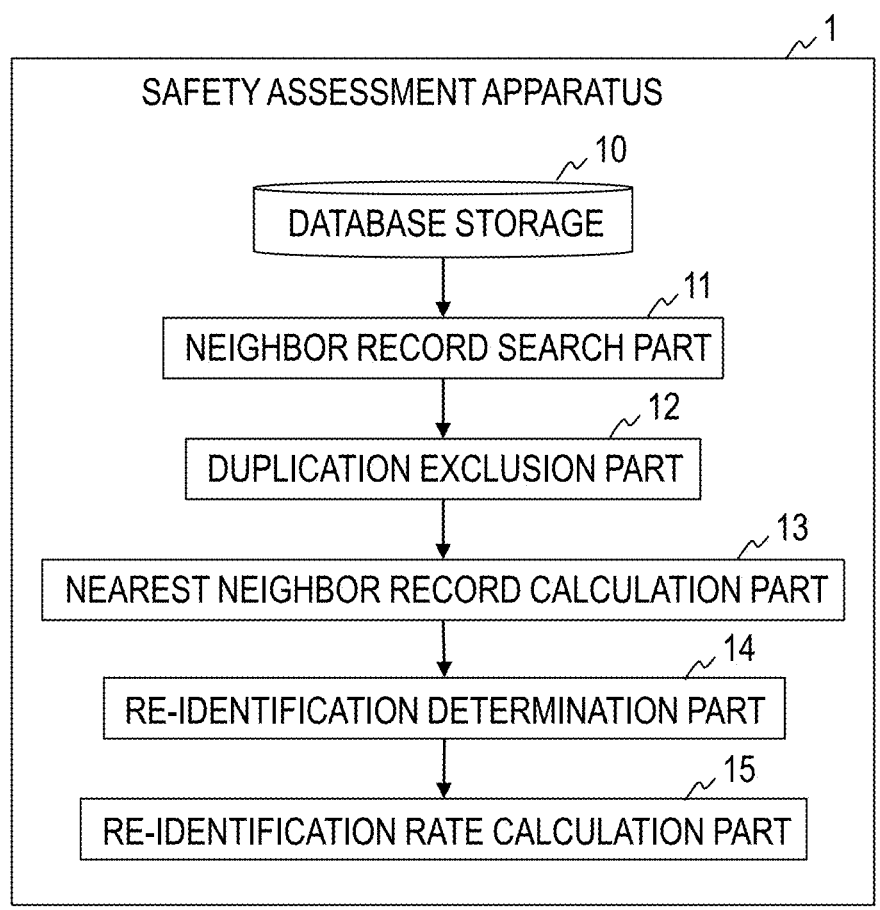
FIG. 4 is a diagram exemplifying a functional configuration of a safety assessment apparatus according to an embodiment.

A safety assessment apparatus and method according to an embodiment executes <Algorithm 1> described above and assesses the safety of a secure database. A safety assessment apparatus 1 according to the embodiment includes a database storage 10, a neighbor record search part 11, a duplication exclusion part 12, a nearest neighbor record calculation part 13, a re-identification determination part 14, and a re-identification rate calculation part 15, as exemplified in FIG. 4. The safety assessment apparatus 1 performs processes of steps exemplified in FIG. 5, and the safety assessment method according to the embodiment is implemented.

The safety assessment apparatus 1 is a special apparatus in which a special program is read into a known or dedicated computer including, for example, a central processing unit (CPU) and a main storage device (RAM: Random Access Memory). The safety assessment apparatus 1 performs each process, for example, under control of the central processing unit. Data input into the safety assessment apparatus 1 or data obtained in each process is stored in, for example, the main storage device, and the data stored in the main storage device is read out to the central processing unit and used for other processes as needed. At least part of each processing part of the safety assessment apparatus 1 may be made of hardware such as an integrated circuit. Each storage included in the safety assessment apparatus 1 can be composed of, for example, a main storage device such as a RAM (Random Access Memory), an auxiliary storage device composed of a hard disk, an optical disk, or a semiconductor memory element like a flash memory, or middleware such as a relational database or a key-value store.

Figure 5:
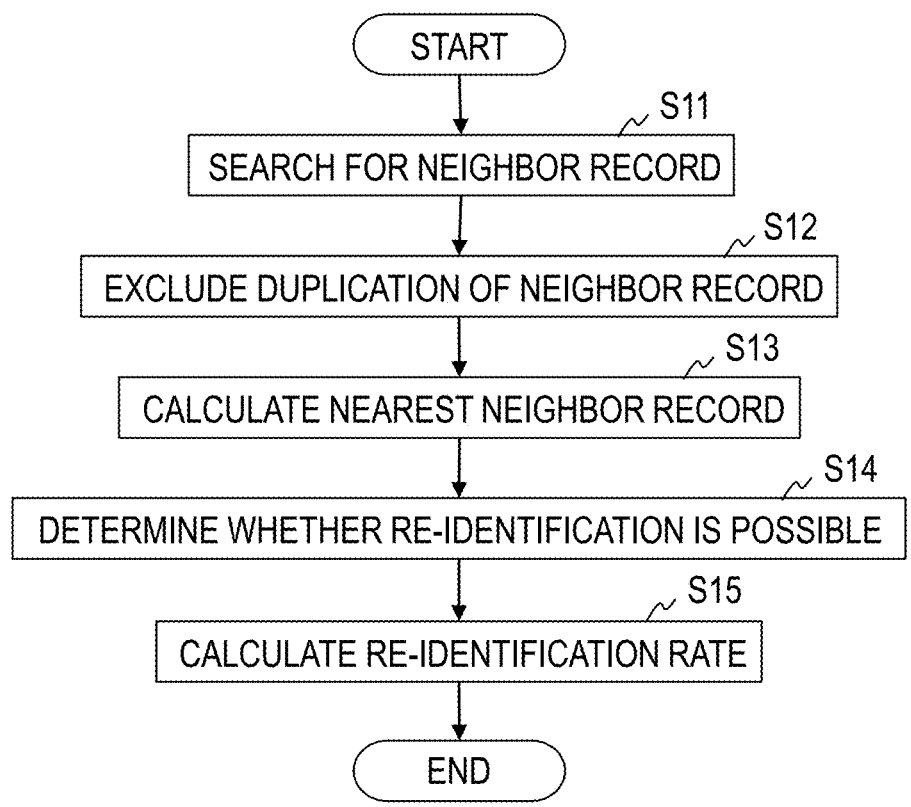
FIG. 5 is a diagram exemplifying a processing procedure of a safety assessment method according to the embodiment.

Hereinafter, the safety assessment method executed by the safety assessment apparatus 1 according to the embodiment will be described with reference to FIG. 5.

The database storage 10 stores an original database $\vec{X} = \{\vec{x}_1, \ldots, \vec{x}_N\}$ composed of plaintext records $\vec{x}_i$ ($i=1, \ldots, N$, $N \geq 2$), a secure database $\vec{Y} = \{\vec{y}_1, \ldots, \vec{y}_N\}$ that conceals the original database $\vec{X}$, and a row number correspondence function $f_y$ that associates row numbers in the original database $\vec{X}$ with row numbers in the secure database $\vec{Y}$.

In step S11, the neighbor record search part 11 obtains a neighbor record set $\vec{X}_i^{near} = \{\vec{x}_j\}$ ($j \in \{1, \ldots, N\}$) having a predetermined neighborhood number K by the neighbor search of the original database $\vec{X}$ with respect to each record $\vec{y}_i$ in the secure database $\vec{Y}$. At this time, the neighborhood number K is set to, for example, log N, a logarithm of the number N of records in the original database $\vec{X}$. The neighbor search uses a neighbor search using either the tree structure or hashing and, for example, a method using the kd tree is used. The neighbor record search part 11 outputs the obtained neighbor record set $\vec{X}_i^{near}$ to the duplication exclusion part 12.

In step S12, if the number of records in the neighbor record set $\vec{X}_i^{near}$ is greater than a predetermined threshold value $\varepsilon K$, the duplication exclusion part 12 excludes duplicate records in the neighbor record set $\vec{X}_i^{near}$ to generate a duplication excluded neighbor record set $\vec{X}_i^{uniq}$. At this time, the threshold value $\varepsilon K$ is set to, for example, twice the neighborhood number (that is, the permissible range $\varepsilon=2.0$). The duplication exclusion part 12 outputs the duplication excluded neighbor record set $\vec{X}_i^{uniq}$ to the nearest neighbor record calculation part 13. If the number of records in the neighbor record set $\vec{X}_i^{near}$ is equal to or less than the threshold value $\varepsilon K$, the duplication exclusion part 12 outputs the neighbor record set $\vec{X}_i^{near}$ to the nearest neighbor record calculation part 13.

In step S13, for each record $\vec{y}_i$ in the secure database $\vec{Y}$, the nearest neighbor record calculation part 13 calculates a distance from each record in the duplication excluded neighbor record set $\vec{X}_i^{uniq}$ if the number of records in the neighbor record set $\vec{X}_i^{near}$ is greater than the threshold value εK, or calculates a distance from each record in the neighbor record set $\vec{X}_i^{near}$ if the number of records in the neighbor record set $\vec{X}_i^{near}$ is equal to or less than the threshold value εK, and then obtains a nearest neighbor record $\vec{Z} = \{\vec{x}_k\}$ ($k \in \{1, \ldots, N\}$) which is the nearest to the record $\vec{y}_i$. The nearest neighbor record calculation part 13 outputs the obtained nearest neighbor record $\vec{Z}$ to the re-identification determination part 14.

In step S14, for each record $\vec{y}_i$ in the secure database $\vec{Y}$, the re-identification determination part 14 calculates a re-identification rate $r_i$ of the record $\vec{y}_i$ on the basis of whether the record $\vec{x}_j$ of the original database $\vec{X}$ associated with the record $\vec{y}_i$ is in the nearest neighbor record $\vec{Z}$. The record $\vec{x}_j$ associated with the record $\vec{y}_i$ can be obtained using the row number correspondence function $f_y$. The re-identification determination part 14 outputs the calculated re-identification rate r of the record $\vec{y}_i$ to the re-identification rate calculation part 15.

In step S15, the re-identification rate calculation part 15 calculates a re-identification rate r of the secure database $\vec{Y}$ on the basis of the re-identification rate r calculated for each record $\vec{y}_i$ in the secure database $\vec{Y}$. For example, the total $\Sigma_{i=1}^{N} r_i$ of the re-identification rate r of each record $\vec{y}_i$ in the secure database $\vec{Y}$ is set as the re-identification rate r of the secure database $\vec{Y}$. The re-identification rate calculation part 15 sets the re-identification rate r of the secure database $\vec{Y}$ as an output of the safety assessment apparatus 1.

The point of the embodiment is to have solved a problem that cannot be solved by simply combining the neighbor search for record linkage, that is, a problem when a large number of neighbor records appear. Specifically, by applying the duplication exclusion process to a large number of neighbor records, the processing time is reduced. In the case where attribute values are duplicated or the like when neighbor records are obtained, since neighbor records equal to or more than a specified neighborhood number are obtained, an execution time will be longer if processing is performed as is. In the worst case, neighbor records are output as many as the number of all records in the database, and as a result, the effect of searching for neighbor records will be lost. In the embodiment, since the process of duplication exclusion is applied when neighbor records are obtained, the above problem can be avoided and high-speed execution is made possible.

As above, the embodiment of the present invention has been described, but specific configurations are not limited to the embodiment, and it goes without saying that even if there is a design modification or the like as appropriate without departing from the scope of the invention, it is included in the invention. The various processes described in the embodiment may be performed not only in chronological order according to the described order, but also in parallel or individually according to processing capability of a device that performs the processes or as needed.

[Program and Recording Medium]

When various processing functions in each apparatus described in the embodiment above are implemented by a computer, processing contents of functions which each apparatus should have are described by a program. Then, the computer executes the program, and thereby the various processing functions in each apparatus can be implemented on the computer.

The program describing the processing contents can be recorded in a computer-readable recording medium. The computer-readable recording medium may be any recording medium, for example, a magnetic recording device, an optical disk, a magneto-optical recording medium, and a semiconductor memory.

Distribution of this program is carried out, for example, by selling, transferring, or lending a portable recording medium such as a DVD or a CD-ROM on which the program is recorded. Furthermore, the program may be stored in a storage device of a server computer, transferred from the server computer to another computer via a network, and thereby distributed.

A computer that executes such a program, for example, first stores the program recorded on the portable recording medium or the program transferred from the server computer temporarily in its own storage device. Then, when executing processing, the computer reads the program stored in its own storage device and performs the processing according to the read program. As another execution form of the program, the computer may directly read the program from the portable recording medium and perform the processing according to the program, or further may sequentially execute processing according to a received program every time the program is transferred from the server computer to the computer. In addition, the program is not transferred from the server computer to the computer, and the above-described processing may be executed by a so-called ASP (Application Service Provider) type service that implements a processing function only by execution instructions and result acquisition. Note that the program in the embodiment includes information which is used for processing by the computer and is similar to the program (data or the like that is not a direct command to the computer but has properties that define processing of the computer).

In the embodiment, the apparatus is configured by executing the predetermined program on the computer, but at least part of the processing contents may be implemented by hardware.

What is claimed is:

1. A safety assessment apparatus comprising:
    a database storage configured to store an original database composed of a plurality of records and a secure database that conceals the original database; and
    processing circuitry configured to:
    obtain, for each record in the secure database, a neighbor record set having a predetermined neighborhood number by a neighbor search of the original database;
    calculate, for each record in the secure database, a distance from each record in the neighbor record set and obtains a nearest neighbor record based on the distance from the record;
    calculate, for each record in the secure database, a re-identification rate of the record based on whether a record in the original database corresponding to the record in the secure database matches the nearest neighbor record; and
    calculate a re-identification rate of the secure database based on the re-identification rate calculated for each record in the secure database.

2. The safety assessment apparatus according to claim 1, wherein the processing circuitry is further configured to exclude duplicate records in the neighbor record set when a number of records in the neighbor record set is greater than a predetermined threshold value.

3. The safety assessment apparatus according to claim 2, wherein: the processing circuitry obtains the neighbor record set by setting the neighborhood number to a logarithm of a number of records in the original database; and the processing circuitry excludes the duplicate records in the neighbor record set by setting the threshold value to twice the neighborhood number.

4. The safety assessment apparatus according to claim 3, wherein the processing circuitry obtains the neighbor record set by a neighbor search using a kd tree.

5. A non-transitory computer readable medium having a program recorded thereon for causing a computer to function as the safety assessment apparatus according to claim 1.

6. A safety assessment method comprising:

storing, in a database storage of a safety assessment apparatus, an original database composed of a plurality of records and a secure database that conceals the original database;

obtaining, by processing circuitry of the safety assessment apparatus, for each record in the secure database, a neighbor record set having a predetermined neighborhood number by a neighbor search of the original database;

calculating, by the processing circuitry of the safety assessment apparatus, for each record in the secure database, a distance from each record in the neighbor record set and obtaining a nearest neighbor record based on the distance from the record;

calculating, by the processing circuitry of the safety assessment apparatus, for each record in the secure database, a re-identification rate of the record based on whether a record in the original database corresponding to the record in the secure database matches the nearest neighbor record; and calculating, by the processing circuitry of the safety assessment apparatus, a re-identification rate of the secure database based on the re-identification rate calculated for each record in the secure database.

* * * * *

UNITED STATES PATENT AND TRADEMARK OFFICE
CERTIFICATE OF CORRECTION

| | |
|---|---|
| PATENT NO. | : 11,354,317 B2 |
| APPLICATION NO. | : 17/052211 |
| DATED | : June 7, 2022 |
| INVENTOR(S) | : Satoshi Hasegawa |

It is certified that error appears in the above-identified patent and that said Letters Patent is hereby corrected as shown below:

In the Claims

Column 8, Line 53, "obtains" should be changed to -- obtain --;

Column 9, Line 9, "claim 3" should be changed to -- claim 1 --.

Signed and Sealed this
Fifteenth Day of November, 2022

Katherine Kelly Vidal
*Director of the United States Patent and Trademark Office*